United States Patent
Hwang et al.

(10) Patent No.: US 8,002,424 B2
(45) Date of Patent: Aug. 23, 2011

(54) LIGHTING APPARATUS FOR A GAMING MACHINE CABINET

(75) Inventors: John Feng Shi Hwang, Bexley (AU); Noel Voloh, Bondi Junction (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 320 days.

(21) Appl. No.: 12/245,552

(22) Filed: Oct. 3, 2008

(65) Prior Publication Data

US 2009/0174346 A1 Jul. 9, 2009

(30) Foreign Application Priority Data

Oct. 5, 2007 (AU) ................................ 2007905466

(51) Int. Cl.
*A47F 11/10* (2006.01)

(52) U.S. Cl. ....................................... 362/125; 362/332

(58) Field of Classification Search ........ 362/97.1–97.4, 362/125, 235, 237, 240, 244, 246, 249.02, 362/311.02, 311.06, 311.13–311.19, 329–330, 362/332, 602–605; 273/143 R; 463/20, 463/30–34

See application file for complete search history.

(56) References Cited

U.S. PATENT DOCUMENTS

| | | |
|---|---|---|
| 2003/0106982 A1 | 6/2003 | Battig |
| 2004/0057251 A1 | 3/2004 | Isaacson et al. |
| 2004/0266524 A1 * | 12/2004 | Williams et al. ................. 463/30 |
| 2006/0194508 A1 | 8/2006 | Johnson et al. |
| 2007/0090386 A1 | 4/2007 | Petrocy |

FOREIGN PATENT DOCUMENTS

| | | |
|---|---|---|
| CA | 2524839 | 10/2006 |
| CA | 2514309 | 1/2007 |
| CN | 1666914 | 9/2005 |
| CN | 1707580 | 12/2005 |
| CN | 1819078 | 8/2006 |
| DE | 19643894 | 5/1991 |
| GB | 956199 | 4/1964 |
| GB | 1158176 | 7/1969 |
| GB | 2307059 | 5/1997 |
| JP | 2005298316 | 10/2005 |
| JP | 2005298317 | 10/2005 |
| JP | 2005318456 | 11/2005 |
| JP | 2006067219 | 3/2006 |
| JP | 2006076798 | 3/2006 |
| JP | 2006103508 | 4/2006 |
| JP | 2006278525 | 10/2006 |
| JP | 2006308437 | 11/2006 |
| KR | 100299703 B | 6/2001 |
| KR | 20020057910 | 7/2002 |
| TW | 267529 B | 12/2006 |

* cited by examiner

*Primary Examiner* — Jason Moon Han (74) *Attorney, Agent, or Firm* — Hanley, Flight & Zimmerman, LLC (57) ABSTRACT

A lighting apparatus for a gaming machine cabinet comprising: a spot light source which emits light relative to a central emission axis; and a translucent diffuser spaced from the spot light source, the diffuser comprising an inner portion located so as to intercept light emitted along the emission axis and an outer portion spaced from the emission axis, the inner and outer portions arranged such that the diffuser prevents transmission of more light in the region of the inner portion than in the region of the outer portion.

46 Claims, 10 Drawing Sheets

FIG. 11
Light Output at 15mm

LIGHTING APPARATUS FOR A GAMING MACHINE CABINET

CROSS-REFERENCE TO RELATED APPLICATIONS

The present application claims the benefit of priority to Australian Provisional Patent Application No. 2007905466, filed on Oct. 5, 2007, entitled "LIGHTNING APPARATUS FOR A GAMING MACHINE CABINET", which is herein incorporated by reference in its entirety.

FIELD

The present invention relates to a lighting apparatus for a gaming machine cabinet, a gaming machine cabinet and a translucent diffuser.

BACKGROUND

The aesthetics of a cabinet of a gaming machine, and indeed of the game housed by the gaming machine, can influence a player's enjoyment of the gaming machine.

Accordingly, much effort is placed into designing aesthetically appealing artwork to place on the cabinet. Such artwork is often backlit by lighting within the cabinet.

There is a need for alternative lighting techniques suitable for backlighting such artwork.

SUMMARY OF THE INVENTION

In a first aspect, the invention provides lighting apparatus for a gaming machine cabinet including:
- a spot light source which emits light relative to a central emission axis; and
- a translucent diffuser spaced from the spot light source, the diffuser including an inner portion located so as to intercept light emitted along the emission axis and an outer portion spaced from the emission axis, the inner and outer portions arranged such that the diffuser prevents transmission of more light in the region of the inner portion than in the region of the outer portion.

In an embodiment, the inner and outer portions are made of the same material.

In an embodiment, the inner portion is circular and the outer portion includes a plurality of arms extending from the inner portion.

In an embodiment, each of the arms tapers such that the diffuser is star shaped.

In an embodiment, there are 8 to 16 arms.

In an embodiment, there are 10 to 14 arms.

In an embodiment, there are 12 arms.

In an embodiment, the diffuser is mounted on a translucent support member.

In an embodiment, the emitted light of the light source includes a bright central component centered around the emission axis.

In an embodiment, the light source emits light in a polar pattern.

In an embodiment, the light source is a light emitting diode.

In an embodiment, the diffuser is spaced from the light source by a distance in the range of 10-20 mm.

In an embodiment, the distance is about 15 mm.

In an embodiment, the lighting apparatus includes a plurality of light sources and a plurality of diffusers paired with respective ones of the light source.

In a second aspect, the invention provides a gaming machine cabinet including:
- a spot light source which emits light relative to a central emission axis;
- a translucent diffuser spaced from the spot light source, the diffuser including an inner portion located so as to intercept light emitted along the emission axis and an outer portion spaced from the emission axis, the inner and outer portions arranged such that the diffuser prevents transmission of more light in the region of the inner portion than in the region of the outer portion; and an artwork carrying portion arranged to be illuminated by light emitted from the light source.

In an embodiment, the artwork carrying portion is spaced from the light source by a distance in the range of 80-120 mm.

In an embodiment, the artwork carrying portion is spaced from the light source by a distance of about 100 mm.

In an embodiment, the inner and outer portions are made of the same material.

In an embodiment, the inner portion is circular and the outer portion includes a plurality of arms extending from the inner portion.

In an embodiment, each of the arms tapers such that the diffuser is star shaped.

In an embodiment, there are 8 to 16 arms.

In an embodiment, the diffuser is mounted on a translucent support member.

In an embodiment, the emitted light of the light source includes a bright central component centered around the emission axis.

In an embodiment, the light source emits light in a polar pattern.

In an embodiment, the light source is a light emitting diode.

In an embodiment, the diffuser is spaced from the light source by a distance in the range of 10-20 mm.

In an embodiment, the distance is about 15 mm.

In an embodiment, the gaming machine includes a plurality of light sources and a plurality of diffusers paired with respective ones of the light source.

In a third aspect, the invention provides a translucent diffuser for diffusing light from a spot light source, the diffuser including an inner portion adapted to be located so as to intercept light emitted along an emission axis by the light source and an outer portion spaced from the emission axis, the inner and outer portions arranged such that, in use, the diffuser prevents transmission of more light in the region of the inner portion than in the region of the outer portion.

In an embodiment, the inner and outer portions are made of the same material.

In an embodiment, the inner portion is circular and the outer portion includes a plurality of arms extending from the inner portion.

In an embodiment, each of the arms tapers such that the diffuser is star shaped.

In an embodiment, there are 8 to 16 arms.

In a fourth aspect, the invention provides a lighting apparatus for a gaming machine cabinet including:
- a light source which emits light in a brightness pattern; and
- a substantially planar translucent diffuser spaced from the light source and formed to transmit incident light from the light source proportionally to the inverse of the brightness pattern, whereby the light output by the lighting apparatus is substantially uniform in the region of the diffuser.

In an embodiment, the shape of the diffuser is configured to control transmittal of the incident light.

In an embodiment, the diffuser has a circular inner portion and an outer portion including a plurality of arms extending from the inner portion.

In an embodiment, each of the arms tapers such that the diffuser is star shaped.

In an embodiment, there are 8 to 16 arms.

In an embodiment, the diffuser is mounted on a translucent support member.

In an embodiment, the brightness pattern of the light source includes a bright central component centered around an emission axis.

In an embodiment, the light source emits light in a polar pattern.

In an embodiment, the light source is a light emitting diode.

In an embodiment, the diffuser is spaced from the light source by a distance in the range of 10-20 mm.

In an embodiment, the lighting apparatus includes a plurality of light sources and a plurality of diffusers paired with respective ones of the light source.

In a fifth aspect, the invention provides a gaming machine cabinet including:

a light source which emits light in a brightness pattern;

a substantially planar translucent diffuser spaced from the light source and formed to transmit incident light from the light source proportionally to the inverse of the brightness pattern, whereby the light output by the lighting apparatus is substantially uniform in the region of the diffuser; and an artwork carrying portion arranged to be illuminated by light emitted from the light source.

In an embodiment, the shape of the diffuser is configured to control transmittal of the incident light.

In an embodiment, the diffuser has a circular inner portion and an outer portion including a plurality of arms extending from the inner portion.

In an embodiment, each of the arms tapers such that the diffuser is star shaped.

In an embodiment, there are 8 to 16 arms.

In an embodiment, the diffuser is mounted on a translucent support member.

In an embodiment, the brightness pattern of the light source includes a bright central component centered around an emission axis.

In an embodiment, the light source emits light in a polar pattern.

In an embodiment, the light source is a light emitting diode.

In an embodiment, the diffuser is spaced from the light source by a distance in the range of 10-20 mm.

In an embodiment, the gaming machine cabinet includes a plurality of light sources and a plurality of diffusers paired with respective ones of the light source.

In a sixth aspect, the invention provides a translucent diffuser for diffusing light emitted by a light source in a brightness pattern, the diffuser being substantially planar and formed to transmit incident light from the light source proportionally to the inverse of the brightness pattern, whereby the light output by the lighting apparatus is substantially uniform in the region of the diffuser.

In an embodiment, the shape of the diffuser is configured to control transmittal of the incident light.

In an embodiment, the diffuser has a circular inner portion and an outer portion including a plurality of arms extending from the inner portion.

In an embodiment, each of the arms tapers such that the diffuser is star shaped.

In an embodiment, there are 8 to 16 arms.

BRIEF DESCRIPTION OF THE DRAWINGS

Certain exemplary embodiments of the invention will now be described in relation to the accompanying drawings in which.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

Certain embodiments are described in relation to an example where a lighting apparatus is incorporated within the cabinet of a gaming machine to light artwork.

Persons skilled in the art will appreciate that in the case of a gaming machine, most aspects of the game are implemented on the game machine although functions such as a jackpot function may be implemented on a remote server when a gaming machine is part of a gaming network.

In the context of server based gaming, a cabinet with a display for viewing the game and operable by the player to play the game is sometimes referred to as an "interactive video terminal" (IVT) or similar to provide a distinction from stand alone gaming machines as the IVT acts as a client and implements some parts of the game, such as output of images to the display and receipt of gaming instructions from buttons or a touch screen while other aspects of the game are implemented on a gaming server. However, it will be appreciated that such IVTs will take a similar outward form to standalone gaming machines and accordingly, herein should be understood as falling within the meaning of a "gaming machine" and as having a gaming machine cabinet unless the context implies otherwise.

Figure 1:
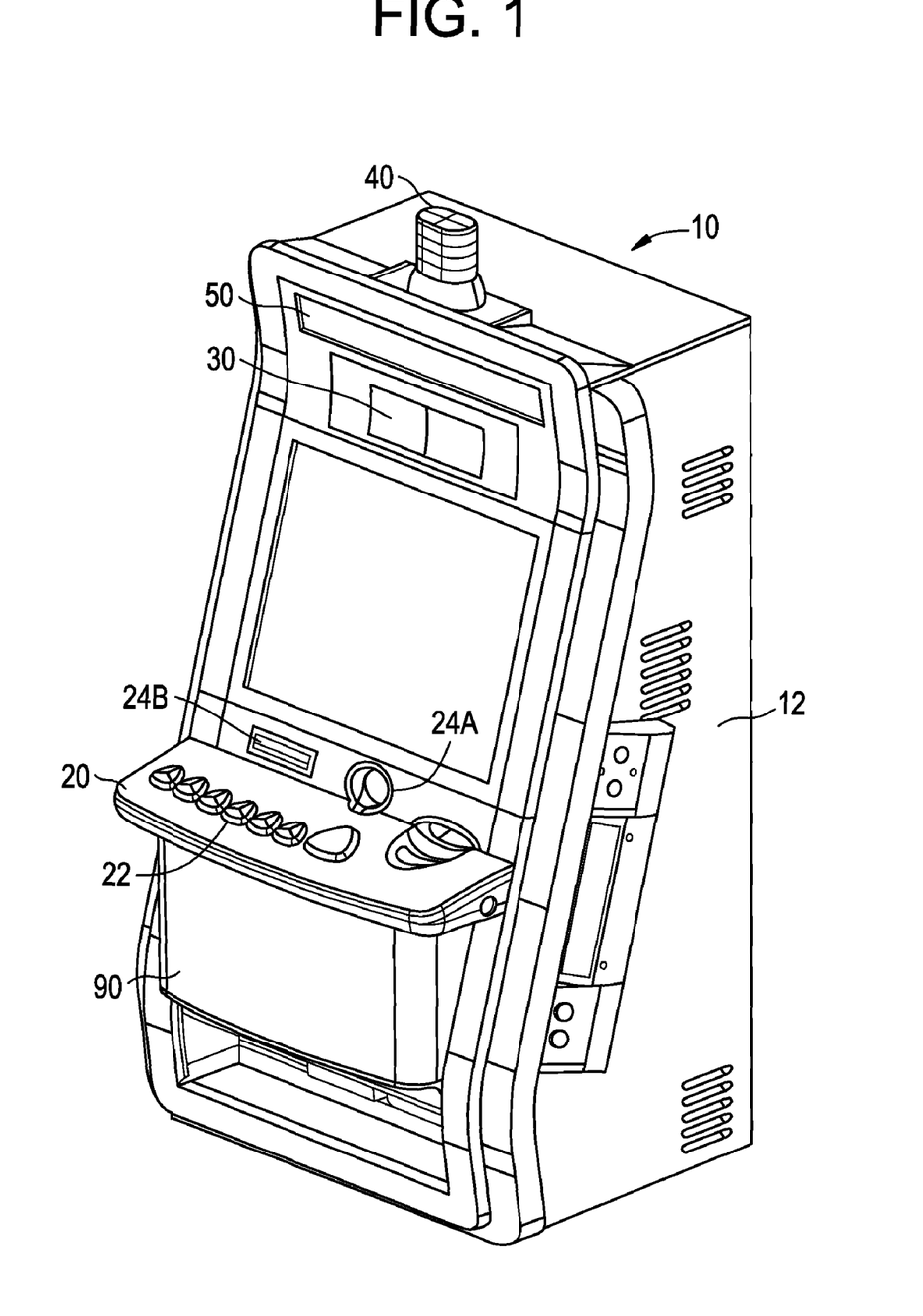
FIG. 1 is a perspective view of a gaming machine of an embodiment.

A stand alone gaming machine 10 is illustrated in FIG. 1. The gaming machine 10 cabinet 12 has a display 14 on which is displayed representations of a game 16 that can be played by a player. The display 14 is a liquid crystal display, but may be a cathode ray tube, plasma screen, or any other suitable video display unit. A mid-trim 20 of the gaming machine 10 houses a bank of buttons for enabling a player to interact with the gaming machine, in particular during game play. The mid-trim 20 also houses a credit input mechanism 24 which in this example includes a coin input chute 24A, a printer 24B, and a bill collector 24C. Other credit input mechanisms may also be employed, for example, a card reader for reading a smart card, debit card or credit card. A player marketing module 30 is provided above the display 14, which has reading device provided for the purpose of reading a player tracking device, for example as part of a loyalty program. The player tracking device may be in the form of a card, flash drive or any other portable storage medium capable of being read by the reading device. There is a light tower (or "candle") on the top of the cabinet 12 which is capable of outputting a plurality of different coloured lights in response to the operating state of the machine. For example, to indicate a fault or a security breach or in response to a player request for a personal service such as collecting a jackpot payout or ordering a beverage.

In the embodiment, artwork 50 which is intended to be backlit is provided towards the top of the cabinet 12. Persons skilled in the art will appreciate that artwork may be located on other parts of a gaming cabinet, for example, on the belly 90.

Figure 2:
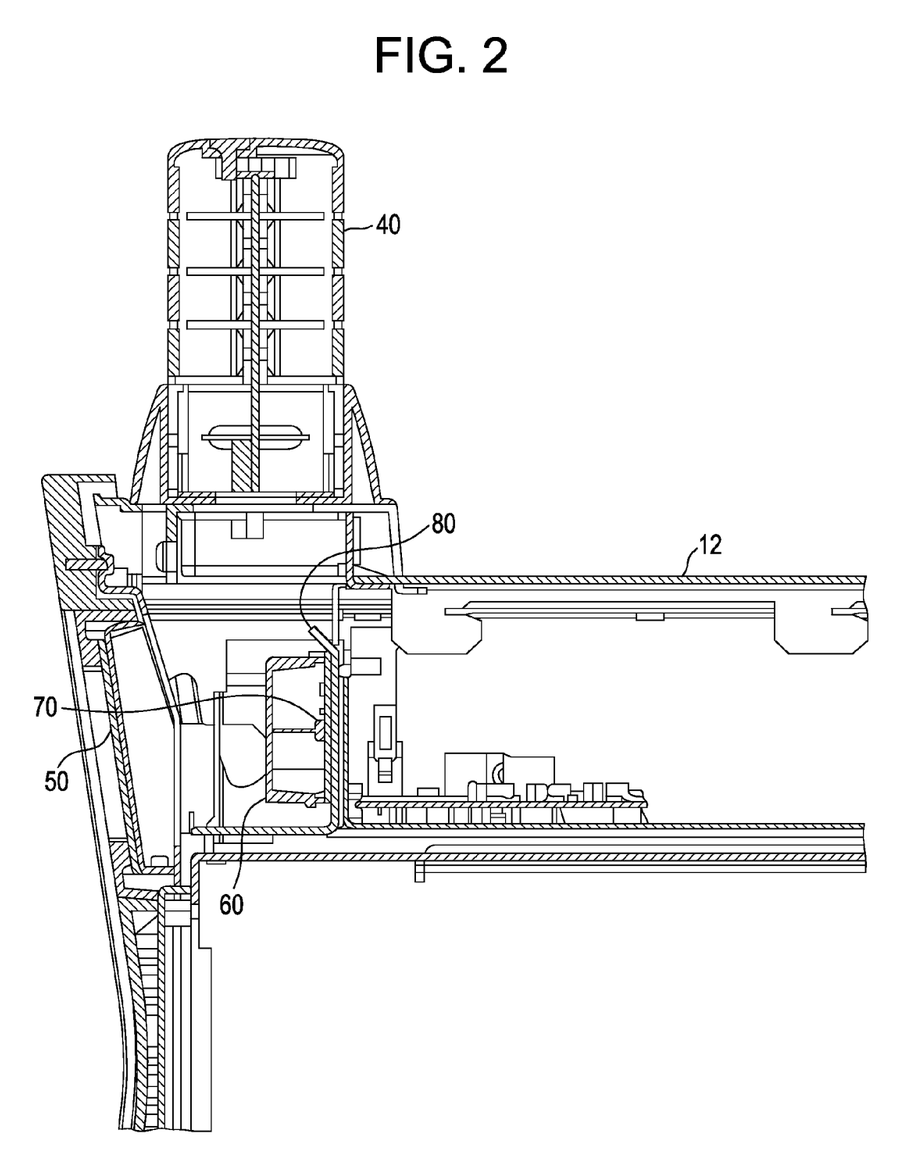
FIG. 2 is a cross-section of a portion of the gaming machine.

FIG. 2 shows the relationship of the lighting apparatus to the artwork 50. The cross-section of FIG. 2 (which is through the upper portion of the gaming machine cabinet 12) shows that a diffuser box 60 is mounted to surround a plurality of light emitting devices (LEDs) 70 which is mounted to a circuit board 75 which provides the necessary electrical connections for driving the LEDs. The cabinet 12 includes a reflector 80 for reflecting laterally transmitted light towards the artwork 50. The diffuser box 60 is shown in a front view in FIG. 3 from which will be apparent that it is mounted to the cabinet 12 by mounting points 64a, 64b and has four star shaped diffusers 62 which are paired with respective ones of four LEDs in this example.

Figure 3:
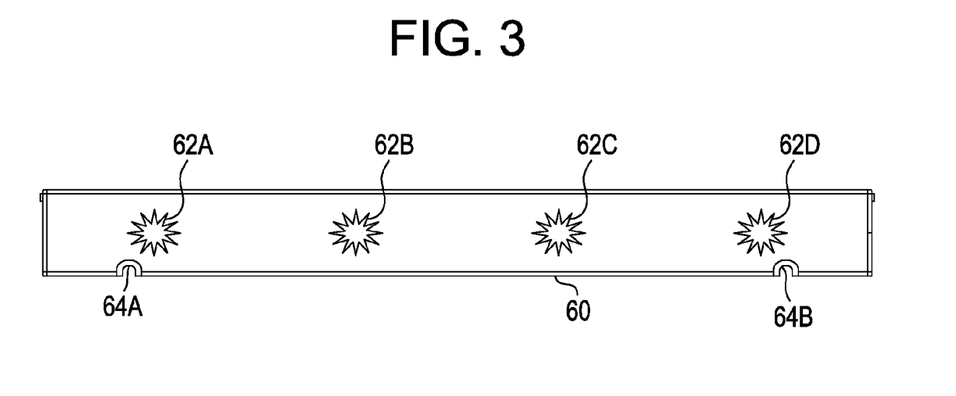
FIG. 3 is a front view of a diffuser box.

Each of the diffuser stars 62 is intended to overlay a "hot spot" on the diffuser box 60 caused by the projection of light from the LED which provides a spotlight source. The diffuser stars 62 act to diminish the "hot spot" effect of spot light sources such that a more even light is projected on the artwork 50.

Figure 5:
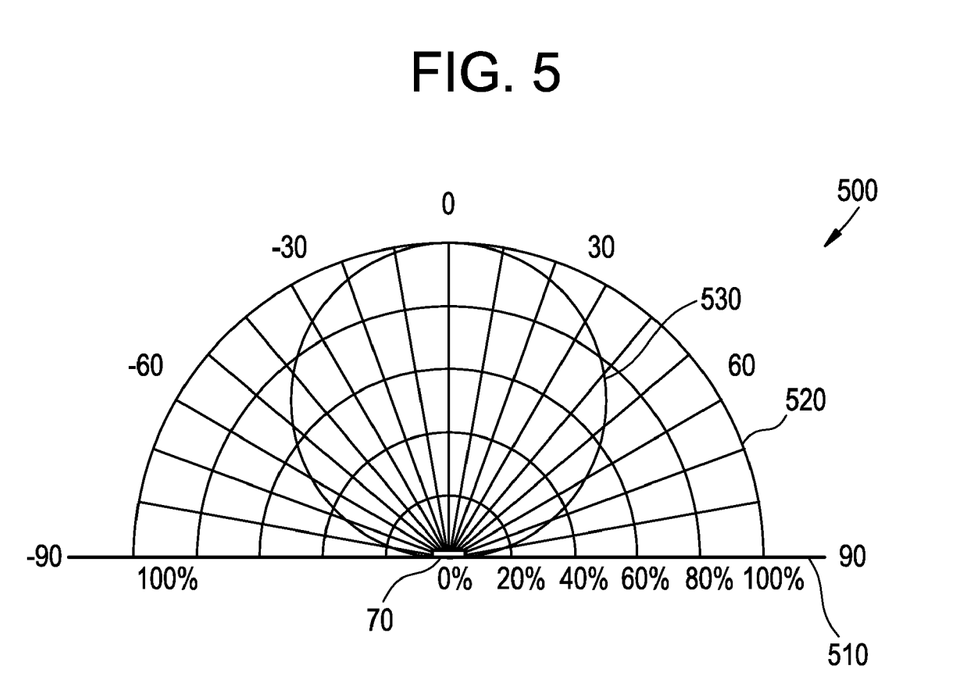
FIG. 5 shows a polar radiation pattern of an LED.

As is shown in FIG. 5, light is emitted from the LED 70 in a polar radiation pattern 530. The radiation pattern 30 is represented in the graph of FIG. 5 by showing the relative percentage of light transmitted on axis 510 relative to various angles 520. It will be seen that the light is strongest along the central transmission axis of the LED 70 which is represented as the 0° mark. Accordingly, the light intensity falls off to below 80% by the time the light is 40 degrees off centre. Accordingly, it will be appreciated that the region immediately around the central emission axis of the LED leads to a "hot spot". Without the advantageous diffusers of embodiments of the invention, such a hot spot can provide an uneven lighting effect which mitigates against other beneficial properties of LED lighting, including that LEDs use relatively little power, are compact and are easy to control.

Figure 4:
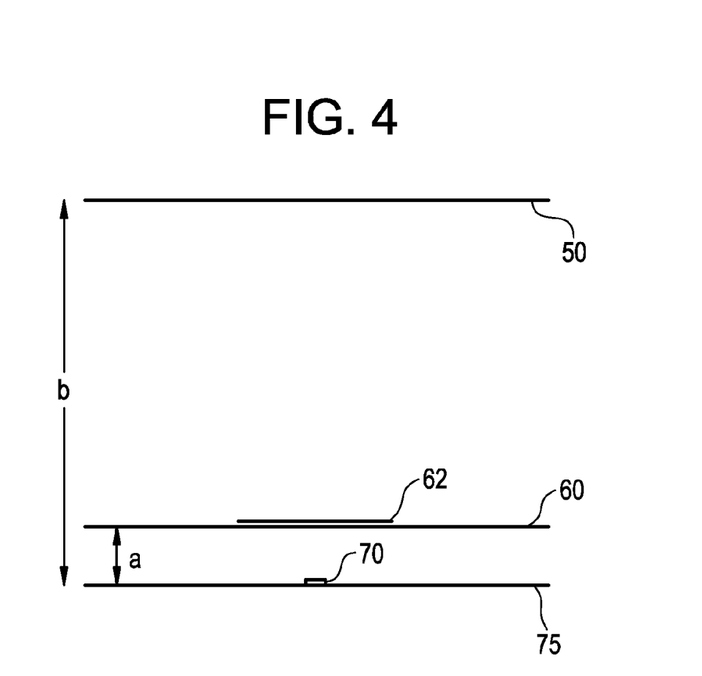
FIG. 4 shows the relative position of artwork, diffuser and light source.

In the illustrated embodiment, as shown in FIG. 4, the diffuser box 60 which carries the diffuser stars 62 is spaced by about 15 mm from an LED 70 which is mounted on printed circuit board 75. The LED is spaced by about 100 mm from artwork 50. Persons skilled in the art will appreciate that these distances can be varied depending on the implementation, for example, the distance a between the LED 70 and the diffuser box 60 could be in the range of 10 mm to 20 mm and the distance b between the LED and the artwork could be in the range of 80 mm to 120 mm.

Figure 6:
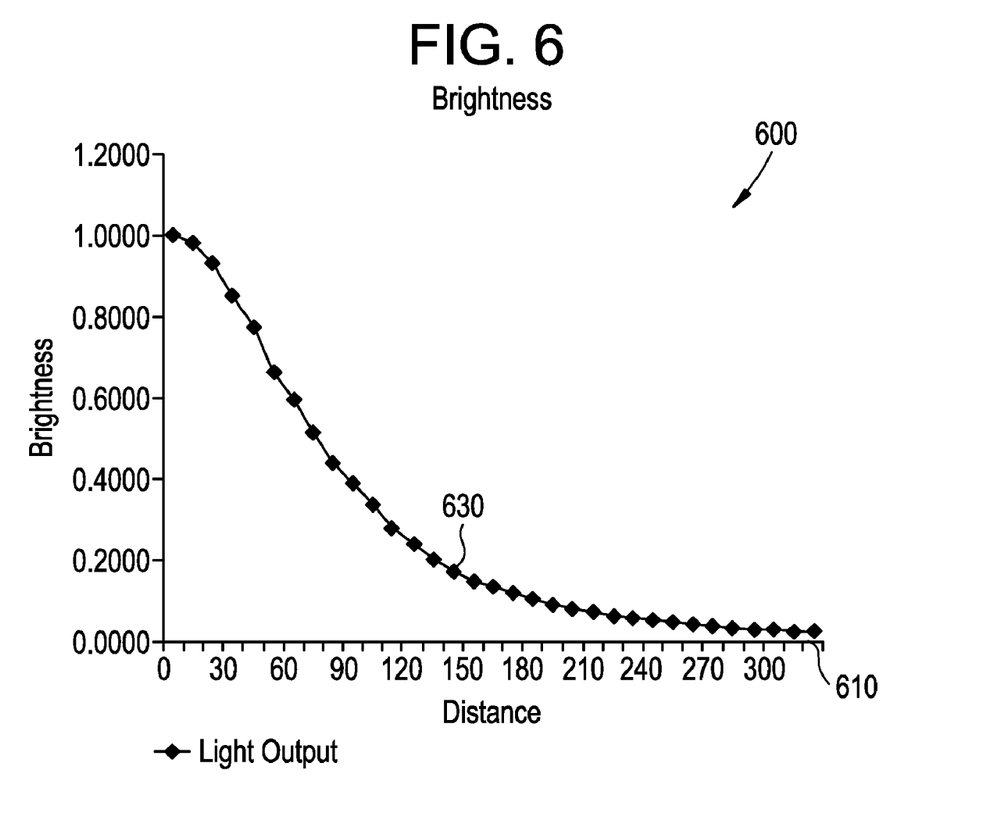
FIG. 6 is a plot of brightness on the artwork at 100 mm.

FIG. 6 illustrates typical brightness on the artwork at 100 mm from an LED without a diffuser with 1.0 being allocated to the maximum relative brightness on a brightness axis 620 and the other axis of the graph 600 representing distance from the central emission axis of the LED.

Figure 11:
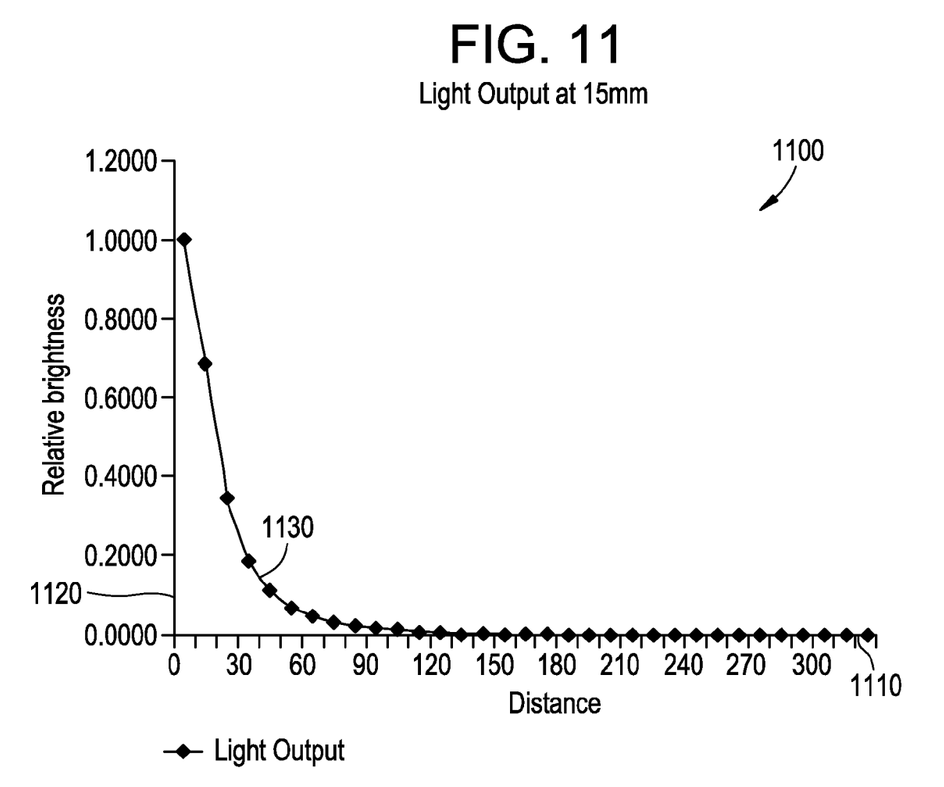
FIG. 11 is a plot of light incident of the diffuser box.

Accordingly, it will be appreciated that the light that is received on the LED is not uniform. In determining how to control the light that illuminates the artwork, it is convenient to examine the light that is incident on the diffuser box 60 which is illustrated in FIG. 11 where the graph 1100 plots 1130 the relative brightness 1120 relative to distance 1110 at a distance approximately 15 mm away from the LED.

Figure 7:
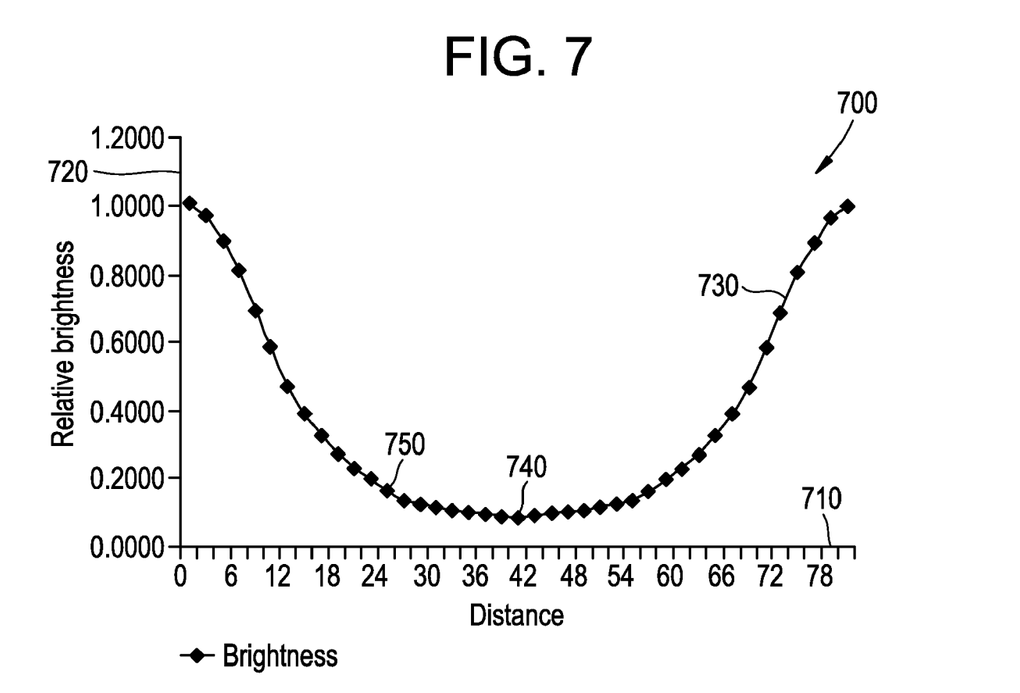
FIG. 7 is a plot of brightness on the diffuser box for LEDs 80 mm apart.

In practice, as indicated in FIG. 3, there will be a plurality of LEDs. Accordingly, the diffuser is designed to compensate for the plurality of LEDs. Referring to FIG. 7, there is shown a plot 730 of relative brightness 720 relative to distance 710. Distance is expressed as a distance from a first central emission axis of a first LED to a second central emission axis of a second LED spaced 80 mm apart. As can be seen from FIG. 7, the minimum relative value of brightness 740 is about 0.1 about half way between the two LEDs. The star diffuser is designed, by taking the minimum brightness and multiplying it by two in order to determine where the outer periphery of the star diffuser should start and have, radius of the star diffuser. In this case, this results in a star diffuser radius 24 mm. The body of the star is chosen to be half the full radius, i.e. to have a 12 mm radius. The transparency of the secondary diffuser is determined to be 0.2 such that the core brightness of the star is also twice the minimum brightness.

Figure 8:
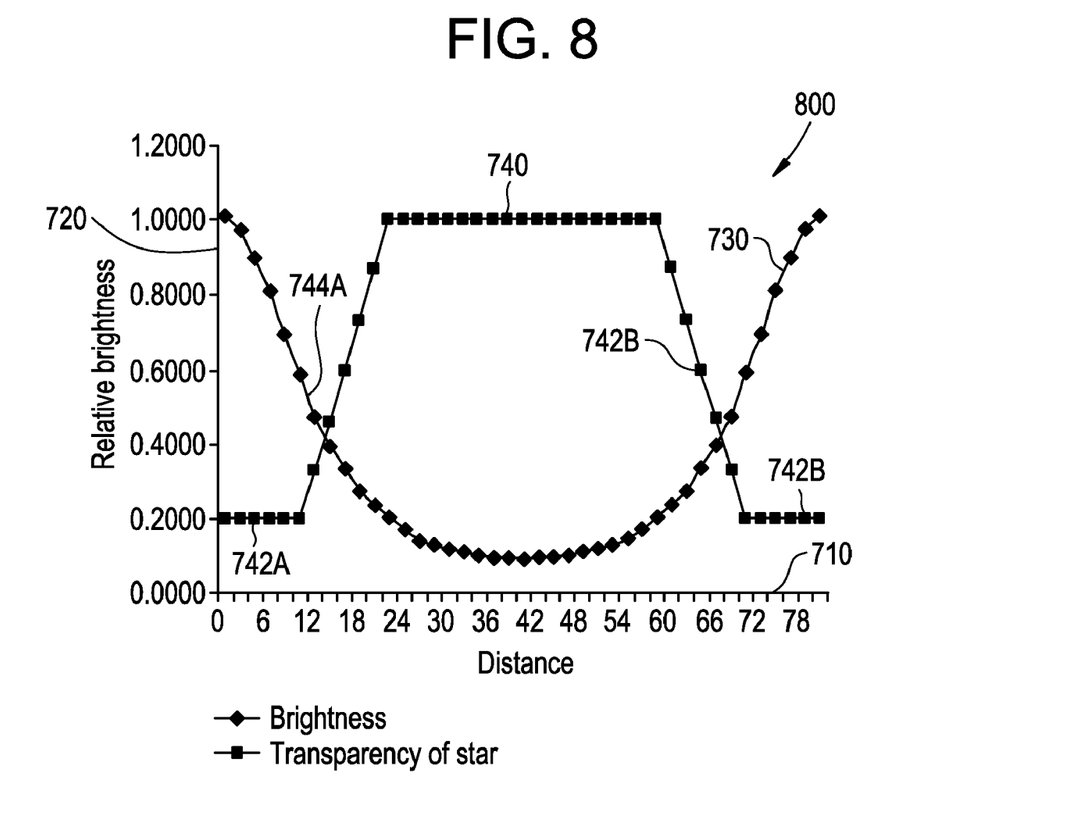
FIG. 8 shows the transparency characteristics of the diffuser.

Accordingly, as indicated in FIG. 8, there is a first portion 742a of the star diffuser which is 12 mm in radius which has a relative brightness effect of 0.2 and a second 744a where there is a gradation from 0.2 to full transmission 740.

Figure 9:
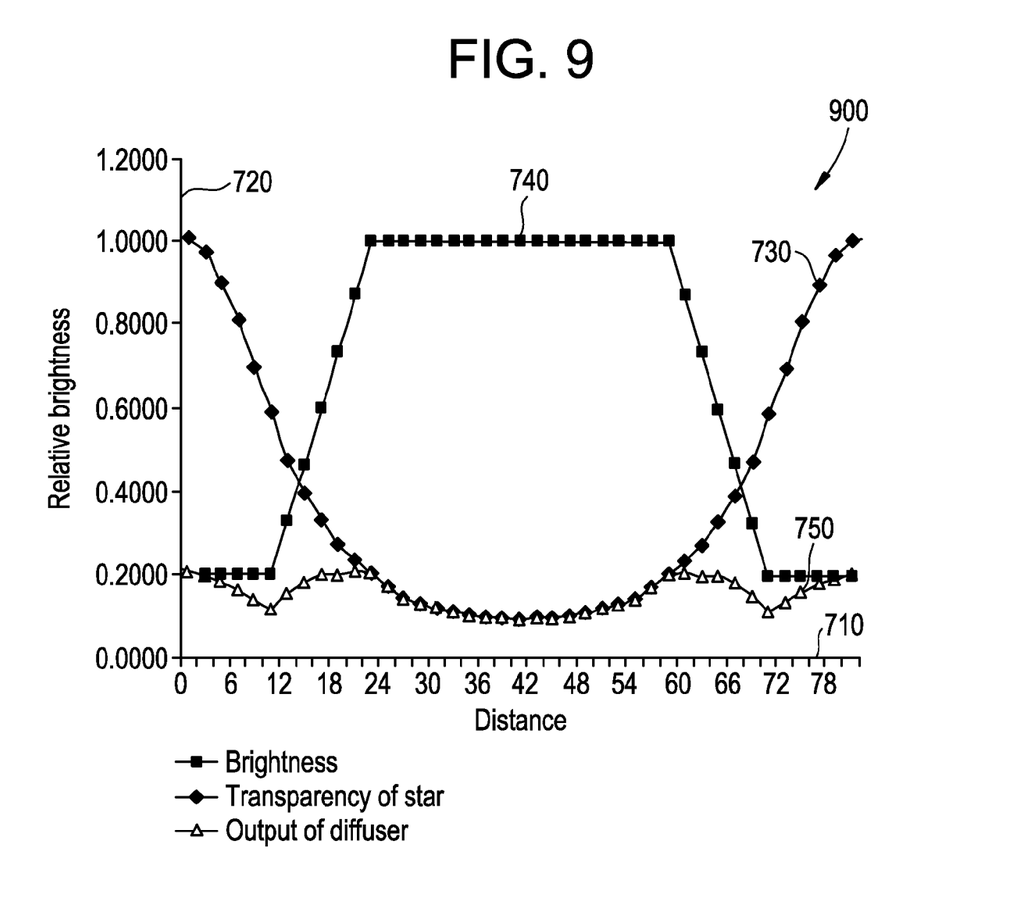
FIG. 9 shows the output of the diffuser with the secondary diffusing star.

This, as shown in the graph 900 of FIG. 9, produces a composite output 750 which is substantially constant in the sense that it has a small variation relative to the variation without the diffuser. Persons skilled in the art will appreciate that the purpose of the star diffuser is to provide an inverse function to a light emission pattern of the light source and hence that other diffusers which provide an inverse function may be employed.

It will be apparent that the radius of the star is selected at a point where the brightness is twice the minimum level and the transparency of the star is calculated by doubling the minimum transmitted light.

Figure 10:
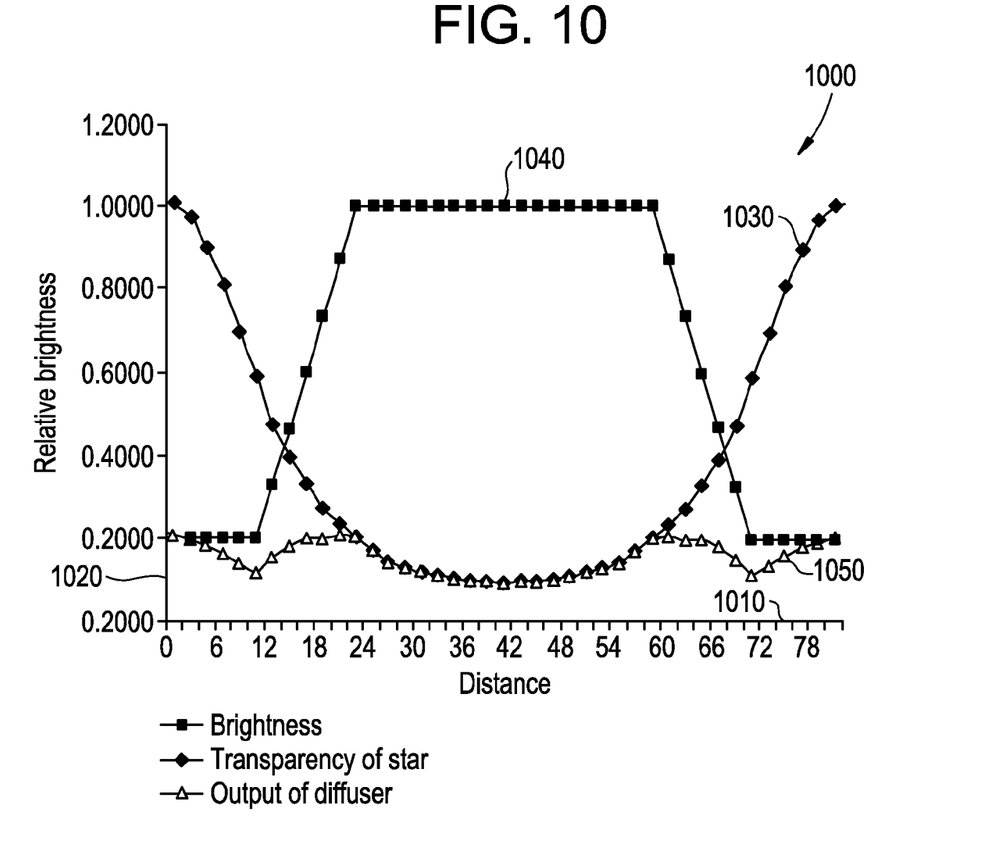
FIG. 10 shows an alternative arrangement where the LEDs are 60 mm apart.

FIG. 10 shows an alternative arrangement where the two LEDs are 60 mm apart. The graph 1000 of FIG. 10 is of relative brightness 1020, relative to distance 1010 with zero being the central emission axis of one of the LEDs. In this case, the minimum brightness is approximately 0.18 and accordingly, the point which is equal to twice the minimum brightness is 0.36 which corresponds to a radius of approximately 14 mm. The transparency of the star as chosen to be 36% to reduce the peak output to 0.26.

FIG. 10 includes plots 100 of the brightness as incident on the diffuser box 1030, relative translucency 1040 of the stars and the diffuser output 1050.

In an embodiment, the diffuser box itself has a translucency of about 60 to 65% and accordingly, when combined with the star diffuser, the composite translucency would be in the case of the example illustrated in FIG. 9 around 13%.

As indicated above, the star pattern matches the entire hot spot area—i.e. where light is not more than twice the minimum brightness and the solid core is chosen to about 50% of the entire hot spot. In an embodiment, so that a similar material can be used to form a star diffuser and overlay on the diffuser box, the inner core and outer arm portions of the star are formed of the same material. Accordingly, the outer arms taper like rays to a point in order to gradually reduce the amount of light blocked by the star diffuser. Persons skilled in the art will appreciate that other variations of the shape of the star diffuser can be achieved. For example, solid arms which terminate at different distances from the centre of the diffuser or stepped arms.

Further, persons skilled in the art will appreciate that the star diffuser and the diffuser box provide a composite diffuser. This is achieved in this embodiment by overlaying the star diffuser on the diffuser box. Persons skilled in the art will appreciate that in other embodiments the diffuser box and the star diffusers could be formed by etching the diffuser box.

Other variations will be apparent to persons skilled in the art and in particular, it will be appreciated that various features described above can be combined to form further embodiments.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A lighting apparatus for a gaming machine cabinet comprising:
a spot light source within the gaming machine cabinet which emits light relative to a central emission axis; and
a translucent diffuser spaced from the spot light source, the diffuser comprising an inner portion located so as to intercept light emitted along the emission axis and an outer portion spaced from the emission axis, the inner and outer portions arranged such that the diffuser prevents transmission of more light in the region of the inner portion than in the region of the outer portion, wherein the inner portion is circular and the outer portion comprises a plurality of arms extending from the inner portion.

2. A lighting apparatus as claimed in claim 1, wherein the inner and outer portions are made of the same material.

3. A lighting apparatus as claimed in claim 1, wherein each of the arms tapers such that the diffuser is star shaped.

4. A lighting apparatus as claimed in claim 1, wherein there are 8 to 16 arms.

5. A lighting apparatus as claimed in claim 1, wherein there are 10 to 14 arms.

6. A lighting apparatus as claimed in claim 1, wherein there are 12 arms.

7. A lighting apparatus as claimed in claim 1, wherein the diffuser is mounted on a translucent support member.

8. A lighting apparatus as claim in claim 1, wherein the emitted light of the light source includes a bright central component centered around the emission axis.

9. A lighting apparatus as claimed in claim 8, wherein the light source emits light in a polar pattern.

10. A lighting apparatus as claimed in claim 1, wherein the light source is a light emitting diode.

11. A lighting apparatus as claimed in claim 1, wherein the diffuser is spaced from the light source by a distance in the range of 10-20 mm.

12. A lighting apparatus as claimed in claim 11, wherein the distance is about 15 mm.

13. A lighting apparatus as claimed in claim 1 comprising a plurality of light sources and a plurality of diffusers paired with respective ones of the light source.

14. A gaming machine cabinet comprising:
a spot light source within the gaming machine cabinet which emits light relative to a central emission axis;
a translucent diffuser spaced from the spot light source, the diffuser comprising an inner portion located so as to intercept light emitted along the emission axis and an outer portion spaced from the emission axis, the inner and outer portions arranged such that the diffuser prevents transmission of more light in the region of the inner portion than in the region of the outer portion; and an artwork carrying portion arranged to be illuminated by light emitted from the light source, wherein the inner portion is circular and the outer portion comprises a plurality of arms extending from the inner portion.

15. A gaming machine cabinet as claimed in claim 14, wherein the artwork carrying portion is spaced from the light source by a distance in the range of 80-120 mm.

16. A gaming machine cabinet as claimed in claim 15, wherein the artwork carrying portion is spaced from the light source by a distance of about 100 mm.

17. A gaming machine cabinet as claimed in claim 14, wherein the inner and outer portions are made of the same material.

18. A gaming machine cabinet as claimed in claim 14, wherein each of the arms tapers such that the diffuser is star shaped.

19. A gaming machine cabinet as claimed in claim 14, wherein there are 8 to 16 arms.

20. A gaming machine cabinet as claimed in claim 14, wherein the diffuser is mounted on a translucent support member.

21. A gaming machine cabinet as claim in claim 14, wherein the emitted light of the light source includes a bright central component centred around the emission axis.

22. A gaming machine cabinet as claimed in claim 21, wherein the light source emits light in a polar pattern.

23. A gaming machine cabinet as claimed in claim 14, wherein the light source is a light emitting diode.

24. A gaming machine cabinet as claimed in claim 14, wherein the diffuser is spaced from the light source by a distance in the range of 10-20 mm.

25. A gaming machine cabinet as claimed in claim 24, wherein the distance is about 15 mm.

26. A gaming machine cabinet as claimed in claim 14 comprising a plurality of light sources and a plurality of diffusers paired with respective ones of the light source.

27. A lighting apparatus for a gaming machine cabinet comprising:
a light within the gaming machine cabinet source which emits light in a brightness pattern; and
a substantially planar translucent diffuser spaced from the light source and formed to transmit incident light from the light source proportionally to the inverse of the brightness pattern, whereby the light output by the lighting apparatus is substantially uniform in the region of the diffuser, wherein the diffuser has a circular inner portion and an outer portion comprising a plurality of arms extending from the inner portion.

28. A lighting apparatus as claimed in claim 27, wherein the shape of the diffuser is configured to control transmittal of the incident light.

29. A lighting apparatus as claimed in claim 27, wherein each of the arms tapers such that the diffuser is star shaped.

30. A lighting apparatus as claimed in claim 27, wherein there are 8 to 16 arms.

31. A lighting apparatus as claimed in claim 27, wherein the diffuser is mounted on a translucent support member.

32. A lighting apparatus as claim in claim 27, wherein the brightness pattern of the light source includes a bright central component centred around an emission axis.

33. A lighting apparatus as claimed in claim 32, wherein the light source emits light in a polar pattern.

34. A lighting apparatus as claimed in claim 27, wherein the light source is a light emitting diode.

35. A lighting apparatus as claimed in claim 27, wherein the diffuser is spaced from the light source by a distance in the range of 10-20 mm.

36. A lighting apparatus as claimed in claim 27, comprising a plurality of light sources and a plurality of diffusers paired with respective ones of the light source.

37. A gaming machine cabinet comprising:
a light source within the gaming machine cabinet which emits light in a brightness pattern;
a substantially planar translucent diffuser spaced from the light source and formed to transmit incident light from the light source proportionally to the inverse of the brightness pattern, whereby the light output by the lighting apparatus is substantially uniform in the region of the diffuser; and an artwork carrying portion arranged to be illuminated by light emitted from the light source, wherein the diffuser has a circular inner portion and an outer portion comprising a plurality of arms extending from the inner portion.

38. A gaming machine cabinet as claimed in claim 37, wherein the shape of the diffuser is configured to control transmittal of the incident light.

39. A gaming machine cabinet as claimed in claim 37, wherein each of the arms tapers such that the diffuser is star shaped.

40. A gaming machine cabinet as claimed in claim 37, wherein there are 8 to 16 arms.

41. A gaming machine cabinet as claimed in claim 37, wherein the diffuser is mounted on a translucent support member.

42. A gaming machine cabinet as claim in claim 37, wherein the brightness pattern of the light source includes a bright central component centered around an emission axis.

43. A gaming machine cabinet as claimed in claim 42, wherein the light source emits light in a polar pattern.

44. A gaming machine cabinet as claimed in claim 37, wherein the light source is a light emitting diode.

45. A gaming machine cabinet as claimed in claim 37, wherein the diffuser is spaced from the light source by a distance in the range of 10-20 mm.

46. A gaming machine cabinet as claimed in claim 37, comprising a plurality of light sources and a plurality of diffusers paired with respective ones of the light source.

* * * * *

UNITED STATES PATENT AND TRADEMARK OFFICE
CERTIFICATE OF CORRECTION

| | | |
|---|---|---|
| PATENT NO. | : 8,002,424 B2 | Page 1 of 1 |
| APPLICATION NO. | : 12/245552 | |
| DATED | : August 23, 2011 | |
| INVENTOR(S) | : Hwang et al. | |

It is certified that error appears in the above-identified patent and that said Letters Patent is hereby corrected as shown below:

ON THE TITLE PAGE:
ITEM (73) ASSIGNEE:
SHOULD READ:

Aristocrat Technologies Australia PTY Limited

North Ryde, NSW, Australia

Signed and Sealed this
Twentieth Day of September, 2011

David J. Kappos
*Director of the United States Patent and Trademark Office*

UNITED STATES PATENT AND TRADEMARK OFFICE
CERTIFICATE OF CORRECTION

PATENT NO. : 8,002,424 B2
APPLICATION NO. : 12/245552
DATED : August 23, 2011
INVENTOR(S) : Hwang et al.

It is certified that error appears in the above-identified patent and that said Letters Patent is hereby corrected as shown below:

In column 8, line 45 (claim 8), after "as" please delete "claim" and add "claimed"

In column 9, line 24 (claim 21), after "as" please delete "claim" and add "claimed"

In column 10, line 5 (claim 32), after "as" please delete "claim" and add "claimed"

In column 10, line 42 (claim 42), after "as" please delete "claim" and add "claimed"

Signed and Sealed this
Fourteenth Day of February, 2012

David J. Kappos
*Director of the United States Patent and Trademark Office*